United States Patent
Logan et al.

(10) Patent No.: US 11,508,275 B1
(45) Date of Patent: Nov. 22, 2022

(54) LASER ENERGY INTEGRATOR FOR DISPLAY WAVEGUIDE BREAKAGE SAFETY SYSTEM

(71) Applicant: GOOGLE LLC, Mountain View, CA (US)

(72) Inventors: Andrew Logan, Waterloo (CA); Dwayne A. Wasylyshyn, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/578,032

(22) Filed: Jan. 18, 2022

(51) Int. Cl.
*G06F 3/01* (2006.01)
*G09G 3/00* (2006.01)

(52) U.S. Cl.
CPC ............. *G09G 3/006* (2013.01); *G09G 3/002* (2013.01); *G09G 2320/0626* (2013.01); *G09G 2330/021* (2013.01)

(58) Field of Classification Search
CPC ........ G09G 3/006; G09G 3/001; G09G 3/002; G09G 2320/06; G09G 2320/0626; G09G 230/021; G03B 7/26; G03B 7/30; G06F 3/012; G06F 3/013
See application file for complete search history.

(56) References Cited

U.S. PATENT DOCUMENTS

| | | | |
|---|---|---|---|
| 9,366,861 B1* | 6/2016 | Johnson | G02B 26/105 |
| 10,534,209 B1 | 1/2020 | Fu et al. | |
| 11,025,871 B1* | 6/2021 | Magoz | G02B 26/101 |
| 2012/0242678 A1 | 9/2012 | Border et al. | |
| 2014/0375898 A1* | 12/2014 | Kurozuka | G02B 26/101 |
| | | | 359/213.1 |
| 2016/0048021 A1 | 2/2016 | Border | |
| 2017/0000329 A1 | 1/2017 | Samec et al. | |
| 2019/0304400 A1* | 10/2019 | Hong | G02B 27/01 |
| 2021/0278756 A1* | 9/2021 | Baron | H04N 9/3161 |

FOREIGN PATENT DOCUMENTS

DE 102011009996 A1 8/2012
WO 2020/010829 A1 1/2020

* cited by examiner

*Primary Examiner* — Dennis P Joseph

(57) ABSTRACT

Systems and methods for implementing a continuously monitoring safety system that tracks emission of light energy from the light source by measuring energy at various sampling points within image frames projected by a projector and estimating a highest energy for a pupil area of each of the image frames based on a subset of sampling points encompassed by the pupil area. The highest energy for each of the image frames is summed to generate a cumulative highest energy, which is compared to a predetermined threshold, and in response to the cumulative highest energy exceeding the threshold, adjusting an power output of the projector.

20 Claims, 5 Drawing Sheets

LASER ENERGY INTEGRATOR FOR DISPLAY WAVEGUIDE BREAKAGE SAFETY SYSTEM

BACKGROUND

Lasers are classified based on their potential to cause injury to human eyes and skin. There are four main classes for visible-beam lasers, with Class 1 lasers being the safest and Class 4 lasers being the least safe. Class 1 lasers are safe under most or all conditions of use because this class of lasers generally has either a low energy output or the lasers are housed in an enclosure that prevents user access to the laser beam during normal operation. Class 2 lasers are relatively safe as long as the user does not stare at the beam for an extended period of time without blinking. Class 3 lasers are generally considered to be dangerous to the eye, especially when used in combination with optical devices that change the beam diameter or power density. Class 4 lasers put out high optical power that is considered to be dangerous without optical devices that change beam diameter and/or power density. Some near-eye image display devices, also known as head-mounted displays (HMDs), use laser projectors to project images via a waveguide to be viewed by a user. The safest HMD device is that in which the maximum accessible exposure is managed such that a user's eye is not subject to more than the equivalent of a Class 1 laser product.

In laser-based image display devices, lasers emit light that defines pixels of a display image. Each pixel may be defined by a combination of red light, green light, and blue light. The brightness of the pixel is related to the laser energy of the red light, green light, and blue light in the combination. Class 1 eye safety limit is typically a measure of allowable energy over a 100-second period. Class 1 eye safety limit dictates the allowable dosage of light by wavelength. Blue light typically has the lowest dosage allowed, followed by green light and red light. Maximum near-eye display brightness must be based on knowing how much light is being projected to the retina. Therefore, display brightness is limited by display area or fill factor. In some HMDs, maximum pixel energy is fixed to a level that allows a percentage of the frame (e.g., 25%) to be rendered at full white for 100 seconds to be safely under a Class 1 eye-safe limit of 3.9 millijoules (mJ) per 100 seconds. However, the waveguides of some HMDs are fragile and may reasonably be expected to break if dropped or roughly handled. Such breakage can result in laser light being projected from the HMD at energy levels that exceed the Class 1 safety standards.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
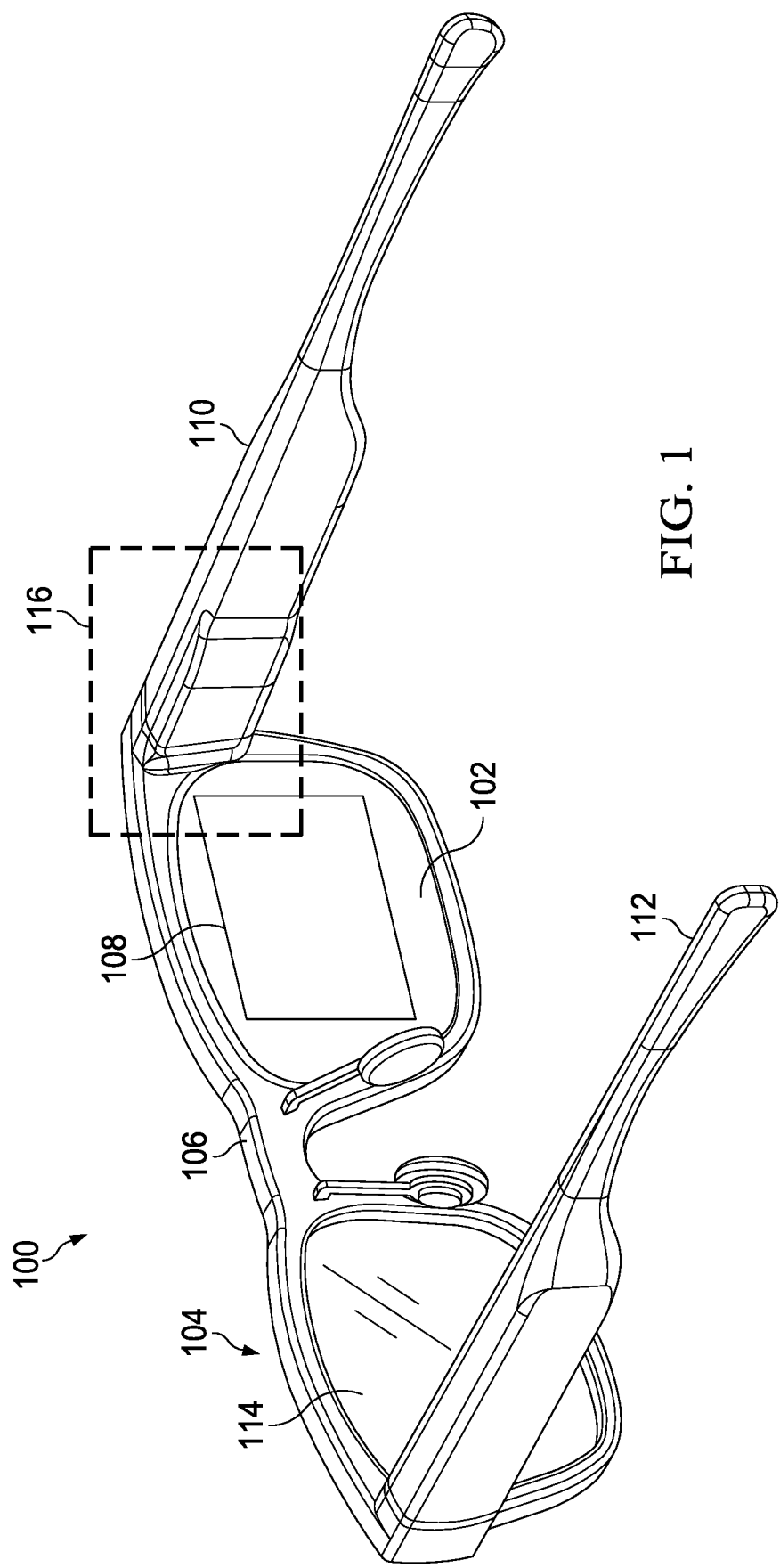
FIG. 1 illustrates an example display system to display content to a user and that implements one or more safety systems and techniques, in accordance with some embodiments.

When displaying images via an HMD, directing excessive amounts of light energy towards an eye of a viewer may cause discomfort or harm to the eye. Consequently, safety guidelines are in effect to set energy thresholds on the optical power output of such display devices. Such power thresholds typically dictate an energy limit and a threshold time. For example, an energy threshold may be specified as no more than 3.9 mJ of energy over a 100 s threshold time. This energy threshold is exemplary, and it is contemplated that other energy thresholds may also be used. In some examples, the 3.9 mJ per 100 s corresponds to a safety limit for eye exposure to Class 1 laser light.

Because HMDs are somewhat inefficient in conveying light from a light source (e.g., a projector) to a user's eye, the light source generally outputs a large amount of light to compensate for light lost from the system in order to ensure a sufficiently bright image is displayed to the user. Consequently, in the event that the waveguide of an HMD breaks, especially near where the light enters the waveguide, the user or a bystander may be exposed to light energy in excess of the Class 1 limit. To prevent injury to users and bystanders, HMDs include a safety switch that turns off or reduces the power of the light source in the event of a break, which is typically detected by monitoring whether an energy threshold is exceeded or whether mechanical integrities are sill intactf. Such a switch may be implemented in hardware, in machine-readable instructions, or using a combination of hardware and machine-readable instructions.

An example hardware-implemented approach to preventing exposing a user to unsafe amounts of light is to simply limit the brightness of the light emitted from the light source of an HMD, such that if the waveguide breaks the accessible emission remains below the Class 1 limit. However, this approach reduces overall display brightness and, hence, the user experience is also potentially negatively impacted. Another approach is to include a waveguide integrity feature, such as a sensor or electrically conductive loop within the waveguide, coupled to a breakage processor, which initiates a deactivation of the display light source in response to determining breakage of the waveguide. A drawback of this approach is the added waveguide manufacturing process steps increase the cost of an already expensive part, and there are potential complications in reliably connecting the integrity feature to the rest of the system given the restrictive space constraints of a typical HMD.

In general, software-based safety systems that are integrated into the main system code are not typically well regarded by the safety community because validation of their robustness and reliability in the context of a large software platform is difficult to accomplish. Additionally, system software is often subject to frequent updates, meaning that complete validation of the software safety system must be carried out for each update. In effect, the system software becomes a key part of the laser safety system and is therefore subject to the same rigor and verification for each release. Thus, isolated and dedicated safety systems are generally preferred.

To detect breakages in the waveguide of an HMD and to minimize the risk of exposing users and/or bystanders to potentially harmful levels of light projected from the waveguide as a result of breakage, FIGS. 1-5 illustrate techniques for implementing a continuously monitoring safety system that tracks emission of light energy from the light source (i.e., projector) as a function of field position as well as time. The disclosed systems and techniques also allow for greater brightness and fill factor of displayed images and/or longer power-on times for the device. The disclosed techniques are applicable to, but not limited to, safety systems that use either photodiodes to measure a fraction of the light exiting the projector or an electrical monitoring component to measure voltage and/or current across each laser diode in the light source.

In general, a 7 mm sized pupil (based on average human dilated pupil size) is used to evaluate emission of light energy that might be incident on a human eye in the event of a waveguide breakage. A 7 mm pupil is only able to collect a portion of the display light that could be emitted and, thus, represents a more realistic measurement of potentially harmful light energy levels than evaluating all of the emitted light. It is this portion of the light that is relevant for the safety calculation (not the total energy emitted). For example, the photodiode of a safety system is used to estimate the light energy projected into the waveguide by a projector at various points throughout a display frame. The total worst-case collectible energy by a 7 mm pupil is then estimated for a particular display image or images using an estimated or measured waveguide incoupling efficiency and stored in dedicated safety hardware (e.g., a safety processor). The safety system then monitors the highest amount of total energy that theoretically would have been incident on a 7 mm pupil over any continuous 100 seconds of the particular display image or images to determine whether it exceeds the allowable safety limit. In the event that the display image or images exceed the energy safety limit, the safety system disables the lasers.

In some embodiments, the safety system is designed such that when a fraction of the allowable energy safety limit has been reached (e.g., 50%) the safety system notifies the display controller that a threshold has been met and the display controller reduces the peak brightness of the projector or changes the display content to prevent exceeding the energy safety limit. In effect, the safety system operates constantly as if the waveguide is broken and the safety system is ensuring that the accessible light is below the Class 1 limit.

FIG. 1 illustrates an example display system 100 that implements one or more safety systems and techniques, in accordance with some embodiments. The display system 100 employs an optical combiner 102 having a support structure 104 that includes a frame 106, which houses a projector (not shown in FIG. 1) that is configured to project images toward the eye of a user, such that the user perceives the projected images as being displayed in a field of view (FOV) area 108 at the combiner 102. The support structure 104 also includes components to allow the support structure 104 to be worn in a position in front of a user's eyes. Examples of such components are arms 110 and 112 (also known as "temples") to be supported by a user's ears. A strap, or straps (not shown), configured to be worn around and/or on top of a user's head may be used in place of one or more of the arms in some embodiments to secure the support structure 104 in front of a user's eyes. In some embodiments, the display system 100 is symmetrically configured such that a lens element 114 is also a combiner and a projector is housed in the portion of the frame 106 proximate to the arm 112 to project images to a FOV area within the lens element 114. In some embodiments, the projector may be housed in a nose bridge portion 120 of the frame 106 to project images to the FOV area within the lens element 114.

In the depicted example, the display system 100 is a near-eye display system in the form of an HMD in which the support structure 104 is configured to be worn on the head of a user and has a general shape and appearance (or "form factor") of an eyeglasses frame. The support structure 104 contains or otherwise includes various components to facilitate the projection of such images toward the eye of the user, such as a projector, which is described in greater detail below with reference to FIG. 2. In some embodiments, the support structure 104 further includes various sensors, such as one or more front-facing cameras, rear-facing cameras, other light sensors, motion sensors, accelerometers, and the like. The support structure 104 further can include one or more radio frequency (RF) interfaces or other wireless interfaces, such as a BLUETOOTH interface, a wireless fidelity (WI-FI) interface, and the like. Further, in some embodiments, the support structure 104 further includes one or more batteries or other portable power sources for supplying power to the electrical and processing components, such as one or more processors of a processing system, of the display system 100. In some embodiments, some or all of these components of the display system 100 are fully or partially contained within an inner volume of the support structure 104, such as within the arm 110 and the portion of the frame 106 in region 116 of the support structure 104. In some embodiments, some or all of these components of the display system 100 are fully or partially contained within the nose bridge portion 120 of the frame 106. It should be noted that while an example form factor is depicted, it will be appreciated that in other embodiments the display system 100 may have a different shape and appearance from the eyeglasses frame depicted in FIG. 1.

In the depicted embodiment, the combiner 102 is used by the display system 100 to provide an augmented reality (AR) display in which rendered graphical content can be superimposed over or otherwise provided in conjunction with a real-world view as perceived by the user through the combiner 102. For example, light used to form a perceptible image or series of images may be projected by a projector of the display system 100 onto the eye of the user via a series of optical elements, such as a waveguide formed at least partially in combiner 102 and one or more lenses and/or filters disposed between the projector and the waveguide. The optical combiner 102 includes at least a portion of a waveguide that routes display light received by an incoupler of the waveguide to an outcoupler of the waveguide, which outputs the display light toward an eye of a user of the display system 100. In addition, the optical combiner 102 is sufficiently transparent to allow a user to see through combiner 102 to provide a field of view of the user's real-world environment such that the image appears superimposed over at least a portion of the real-world environment.

In order to minimize the weight and size of the display system 100 for user comfort and wearability, the optical combiner 102 is typically designed to be quite thin (e.g., 2-6 mm in thickness), which can make it vulnerable to cracks or breakage if dropped or impacted by an object. Accordingly, the processing components discussed above can include a safety system (shown in FIG. 2) that uses either an electrical monitoring component to measure voltage across each laser diode in the projector or a photodiode to measure a fraction of the light intensity projected from each laser diode. In some embodiments, the safety system initiates a deactivation of the projector in response to determining a breakage, fissure, light emissions in excess of safety limits, or some other discontinuity of the display waveguide.

Figure 2:
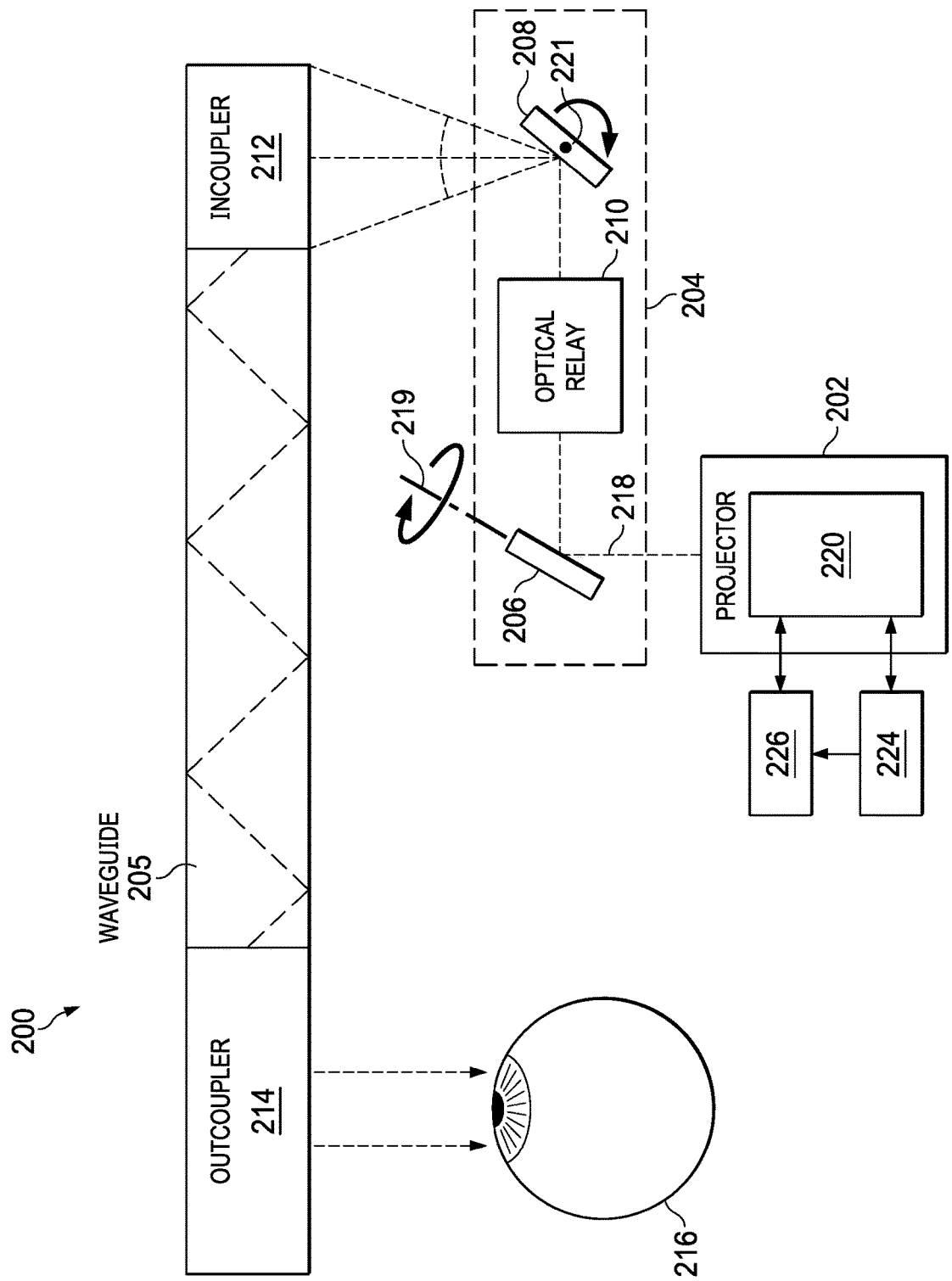
FIG. 2 illustrates a block diagram of a laser projection system that can be implemented in a wearable heads-up display or other display system, such as the display system of FIG. 1, in accordance with some embodiments.

FIG. 2 illustrates a block diagram of a projection system 200 that can be implemented wearable heads-up display or other display system, such as the display system 100 of FIG. 1. The projection system 200 includes a projector 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example.

The projector 202 includes one or more laser light sources configured to generate and output laser light 218 (e.g., visible laser light such as red, blue, and green laser light and, in some embodiments, non-visible laser light such as infrared laser light). In some embodiments, the projector 202 is coupled to a controller 226, which controls the timing of emission and intensity of laser light from the laser light sources of the projector 202 in accordance with instructions received by the controller or driver from a computer processor coupled thereto to modulate the laser light 218 to be perceived as images when output to the retina of an eye 216 of a user. The projector 202 is coupled to the safety system 220, described above, in order to monitor the energy of the emitted laser light.

During operation of the projection system 200, multiple laser light beams having respectively different wavelengths are output by the laser light sources of the projector 202, then combined via a beam combiner (not shown), before being directed to the eye 216 of the user. The projector 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time. In some embodiments, the projector 202 includes various edge-emitting lasers (EELs) that emit laser light 218 of a specific color and the optical relay 210 magnifies or minimizes the laser light 218 along one or both of a first direction (e.g., the semi-major axis of the beam profile of the laser light 218) or a second direction (e.g., the semi-minor axis of the beam profile of the laser light 218) along its semi-major or semi-minor axis to circularize the laser light 218 prior to convergence of the laser light 218 on the second scan mirror 208.

One or both of the first and second scan mirrors 206 and 208 of the optical scanner 204 are microelectromechanical system (MEMS) mirrors in some embodiments. For example, the first scan mirror 206 and the second scan mirror 208 are MEMS mirrors that are driven by respective actuation voltages to oscillate during active operation of the projection system 200, causing the first and second scan mirrors 206 and 208 to scan the laser light 218. Oscillation of the first scan mirror 206 causes laser light 218 output by the projector 202 to be scanned through the optical relay 210 and across a surface of the second scan mirror 208. The second scan mirror 208 scans the laser light 218 received from the first scan mirror 206 toward an incoupler 212 of the waveguide 205. In some embodiments, the first scan mirror 206 oscillates or otherwise rotates around a first axis 219, such that the laser light 218 is scanned in only one dimension (i.e., in a line) across the surface of the second scan mirror 208. In some embodiments, the second scan mirror 208 oscillates or otherwise rotates around a second axis 221. In some embodiments, the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 (e.g., via collimation) in the first dimension to an exit pupil plane of the optical relay 210 beyond the second scan mirror 208.

The waveguide 205 of the projection system 200 includes the incoupler 212 and the outcoupler 214. The term "waveguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an optical combiner, such as optical combiner 102 (FIG. 1) of the display system 100 having an eyeglass form factor and employing the projection system 200.

To facilitate safety monitoring of light entering the eye of a user or bystander, the safety system 220 includes energy monitoring components (not shown), such as photodiodes or current monitoring components, configured to measure a portion of the light projected from each laser diode of the projector or to measure a voltage or current at each laser diode. Information collected by the safety system 220 is provided to a safety processor 224 in order to determine whether the total amount of energy that would be collected by a 7 mm pupil over a predetermined time period exceeds a safety threshold. That is, the safety processor 224 receives measurements representing light intensity from the safety system 220 collected over a predetermined amount of time (e.g., 100 seconds) and compares the running total of the measurements to a first threshold, such as a safety threshold for Class 1 laser light. If the total measured light energy exceeds the threshold at any time within the predetermined amount of time, the safety processor 224 provides a signal to the projector 202 conveying instructions to shut down (i.e., deactivate or reduce power to) the projector 202 so as to prevent potential injury to a user or bystander. In some embodiments, the safety system 220 compares the running total of the measurements to a second threshold that is less than the first threshold (e.g., 50% of the safety threshold for Class 1 laser light) so that if the system is close to exceeding the first threshold, the safety system sends a signal to controller 226, which can then reduce the peak intensity of the light emitted from the projector 202 or change the content of the projected image so as to avoid exceeding the first threshold.

Figure 3:
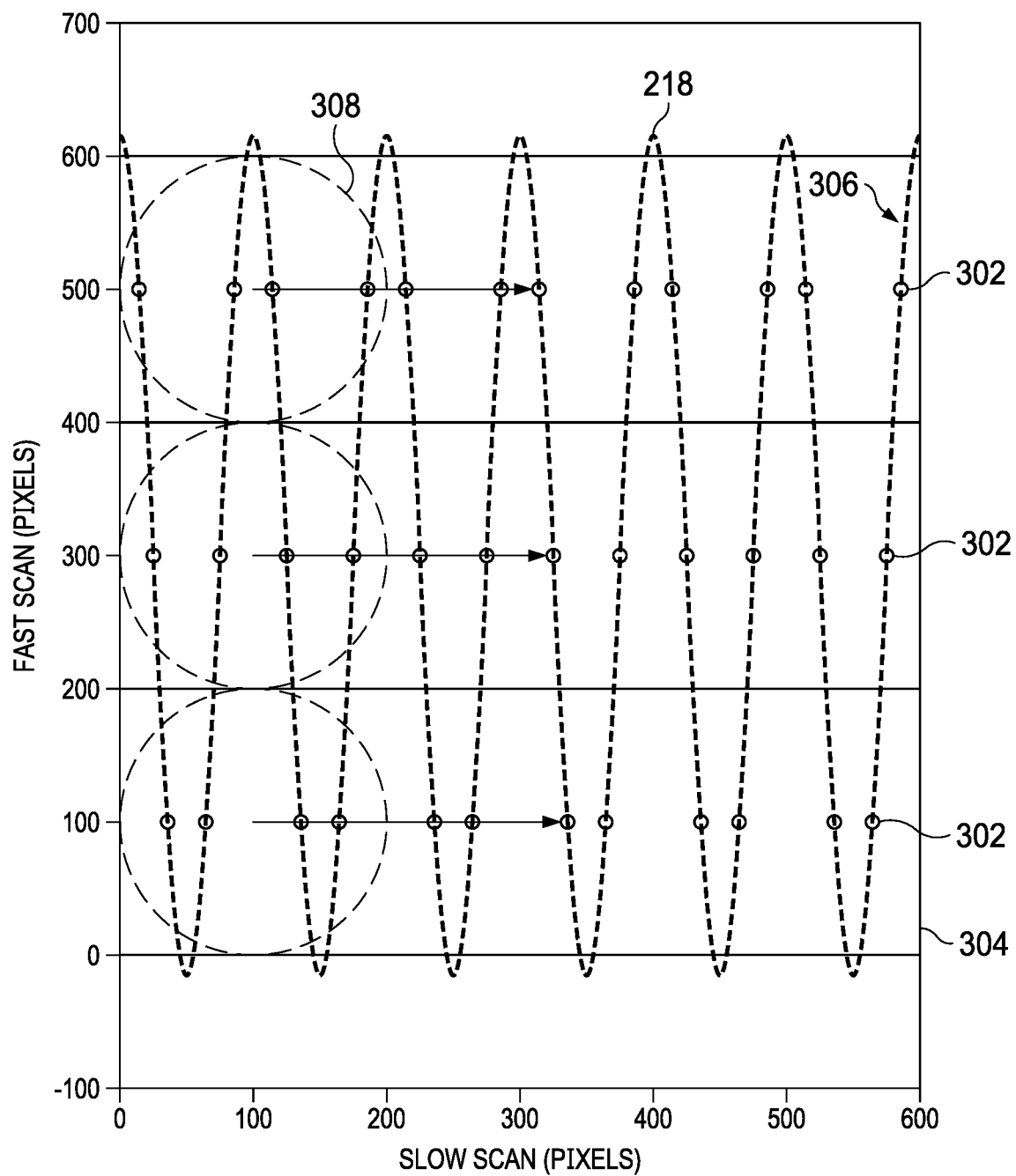
FIG. 3 shows an example laser light scanning pattern of a projection system, such as the projection system of FIG. 2, with sampling points to be measured by a safety system, in accordance with some embodiments.

FIG. 3 shows an example light scanning pattern 300 of a projection system, such as projection system 200, with sampling points 302 to be measured by safety system 220. As discussed above with reference to FIG. 2, light 218 from the projection system 200 is provided from the projector 202 to scanning components, such as MEMS mirrors 206 and 208, to form an image frame 304 which is then conveyed, expanded, and output by various components of a waveguide, such as waveguide 205, for viewing by a user of an HMD. The scanning pattern 300 shows the light 218 emission from projector 202 as a function of field position (measured in pixels) within the image frame 304. Sample points 302 indicate the position at which measurements are collected by the safety system 220. For example, in FIG. 3, three measurements, one at each sampling point 302, are taken for each scan line (e.g., scan line 306). Safety system 220 is configured to sample a particular bandwidth of light at the sampling points 302 such that each measurement is, in effect, a low pass filtered measurement of a certain fraction of the scan line and represents an approximate time average value of that interval. The pupil area 308 is representative of the potential light that is collectible by a pupil of a given size (e.g., 7 mm) at any given position within the frame 304 based on adding the measurements taken at the sampling points 302 encompassed by the pupil area 308. For each image frame 304, the measurements are added to determine the maximum light that would have been collectible by a pupil, represented by pupil area 308, in the event the waveguide 205 was broken, that is, if the light were to be projected out of the waveguide before reaching an outcoupler of the waveguide. The measurements taken by safety system 220 are provided to the safety processor 224 and controller 226, as described above with reference to FIG. 2, and processed as described in greater detail below.

Figure 4:
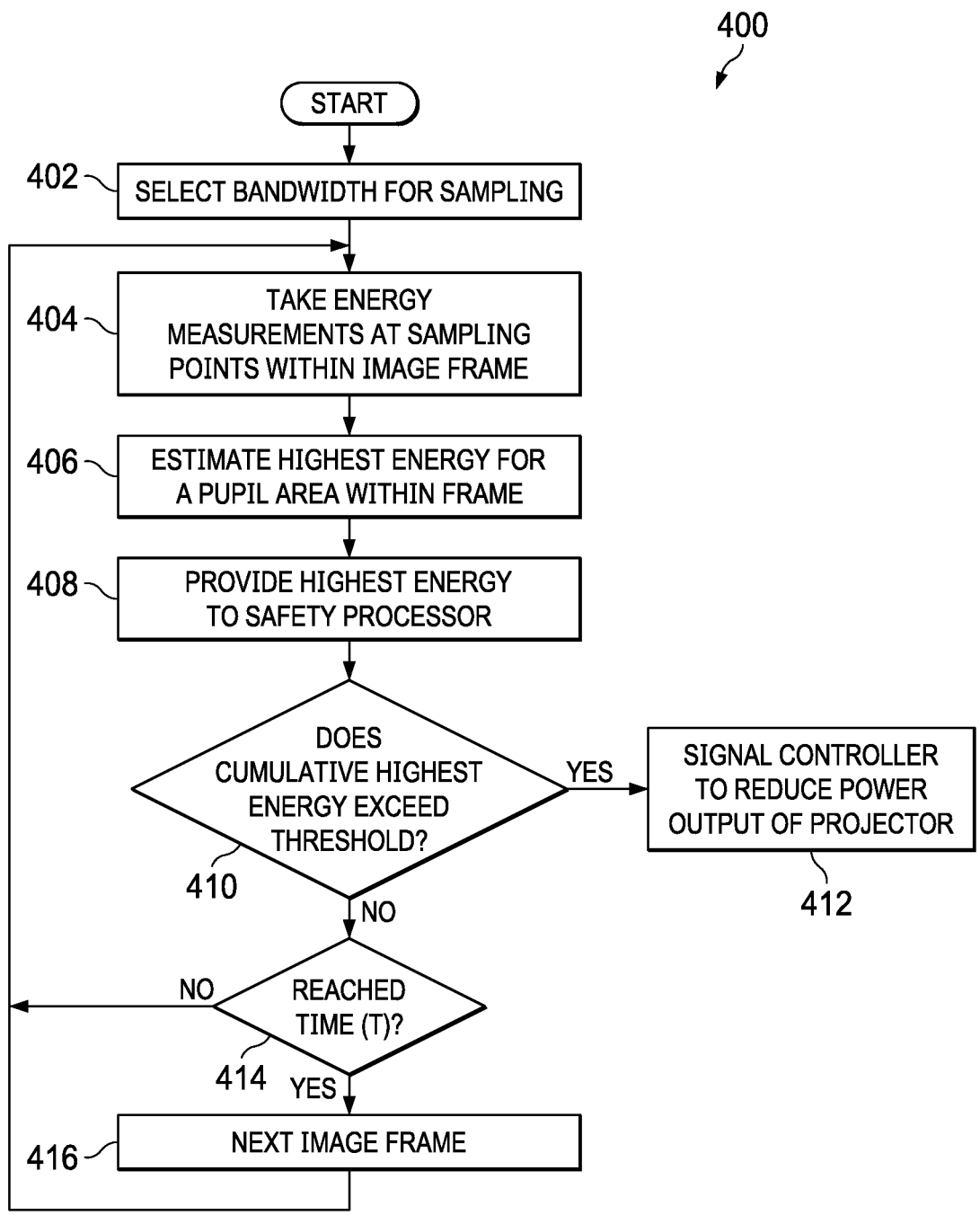
FIG. 4 illustrates a method of employing the safety system to monitor light output from a projection system, such as the projection system of FIG. 2, to prevent light energy output from exceeding a safety threshold, in accordance with some embodiments.

FIG. 4 illustrates a method 400 of employing a safety system, such as safety system 220, to monitor light energy output (i.e., energy) from a projection system, such as projection system 200, to prevent the light energy output from exceeding a safety threshold. At block 402, a wavelength of light is selected for which the safety system 220 will be taking measurements (e.g., blue light having a wavelength of approximately 450 nm). Measurements of light output at the selected bandwidth from the projector 202 are then collected at sampling points 302 within an image frame 304 at block 404. The worst-case scenario is then estimated for frame 304 by estimating the highest possible energy measured at various pupil areas 308 within the frame, at block 406. In some embodiments, the estimated highest energy is calculated by adding the measured energy for all of the sampling points 302 encompassed by a given pupil area and then determining the pupil area 308 with the highest total energy of the frame. The highest total energy for each image frame 304 is then provided to the safety processor 224 at block 408. At block 410, the cumulative total of the highest energy for the image frames 304 that have been sampled is compared to a threshold (e.g., 50% of the safety threshold for Class 1 lasers) and, in the event that the cumulative total is found to exceed the threshold, the safety processor 224 sends a signal to controller 226 conveying instructions to reduce the power output of the projector 202, at block 412. In some embodiments, controller 226 reduces the power output of projector 202 by reducing the intensity of the projected light 218 or by adjusting the projected content. To prevent a user simply turning the projection system 200 off and then on again in response to the projector power output being reduced, the cumulative total is retained through power cycling of the projection system 200. In the event the cumulative total does not exceed the threshold, a determination is made as to whether the predetermined sampling time (T) (e.g., 100 seconds) has been reached, at block 414. If time T has not been reached, the safety system 220 continues taking measurements of image frames 304 and adding the highest energy estimates to the cumulative total. If time T has been reached, the system moves to the next image frame in order to start a new monitoring cycle.

Figure 5:
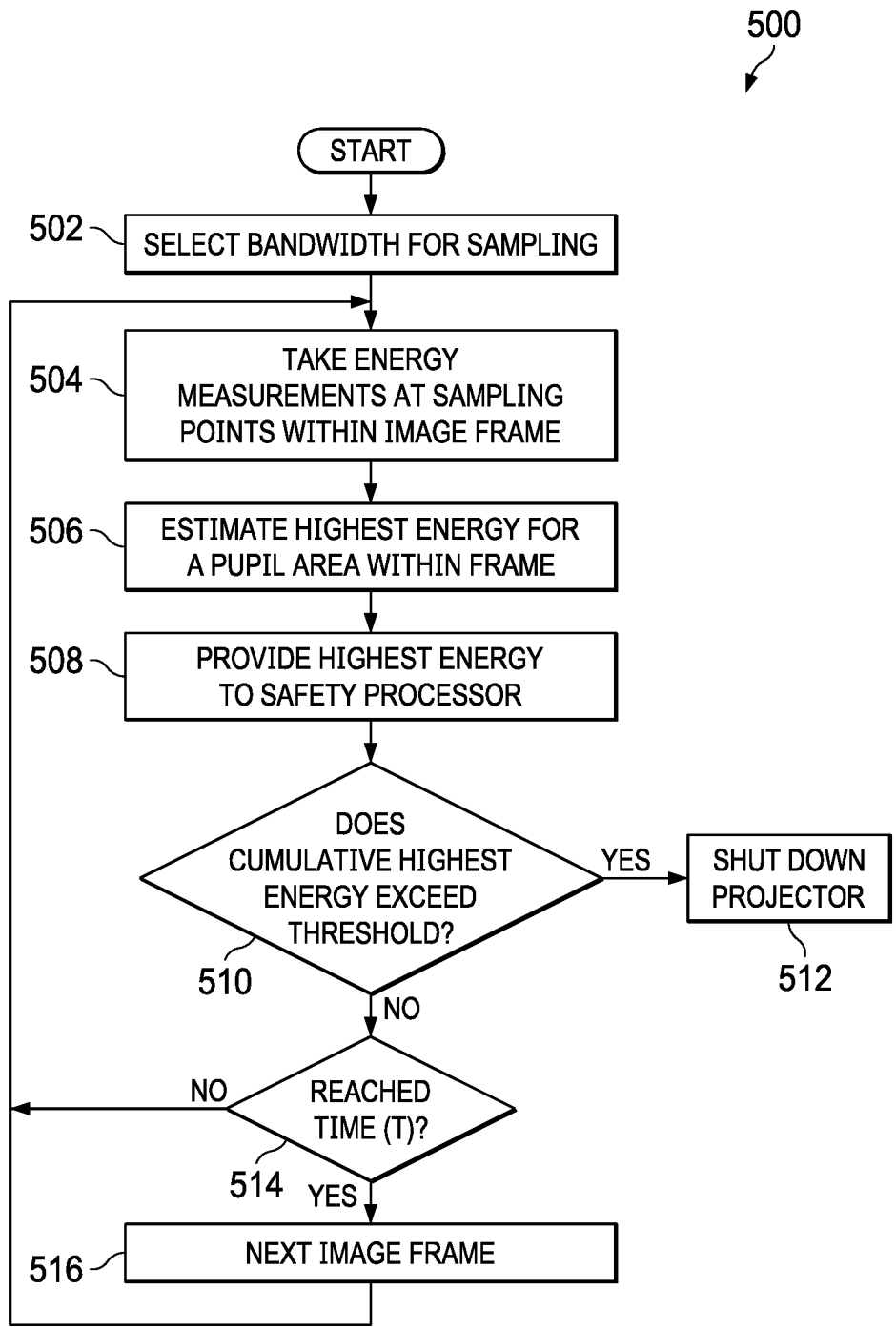
FIG. 5 illustrates a method of employing the safety system to monitor light energy output from a projection system, such as the projection system of FIG. 2, to turn off the projector if the safety threshold is exceeded, in accordance with some embodiments.

FIG. 5 illustrates a method 500 of employing a safety system, such as safety system 220, to monitor light output from a projection system, such as projection system 200, to shut down the projector 202 if the safety threshold is exceeded. At block 502, a bandwidth of light is selected for which the safety system 220 will be taking measurements. Measurements of light output at the selected bandwidth from the projector 202 are then collected at sampling points 302 within an image frame 304 at block 504. The worst-case scenario is then estimated for frame 304 by estimating the highest possible energy at various pupil areas 308 within the frame, at block 506. In some embodiments, the estimated highest energy is calculated by adding the measured energy for all of the sampling points 302 encompassed by a given pupil area and then determining the pupil area with the highest total energy. The highest total energy for each image frame 304 is then provided to the safety processor 224 at block 508. At block 510, the cumulative total of the highest energy for the image frames 304 that have been sampled is compared to a threshold (e.g., the safety threshold for Class 1 lasers) and, in the event that the cumulative total is found to exceed the threshold, the safety processor 224 sends a signal to the projector 202 conveying instructions to shut down and cease emitting light, at block 512. To prevent a user simply turning the projection system 200 back on again in response to the projector being shut down, the cumulative total is retained through power cycling of the projection system 200. In the event the cumulative total does not exceed the threshold, a determination is made as to whether the predetermined sampling time (T) (e.g., 100 seconds) has been reached, at block 514. If time T has not been reached, the system continues taking measurements of image frames 304 and adding the highest energy estimates to the cumulative total. If time T has been reached, the system moves to the next image frame to start a new monitoring cycle.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   measuring energy at a plurality of sampling points within a plurality of image frames projected by a projector;
   estimating a highest energy for a pupil area of each of the plurality of image frames based on a subset of the plurality of sampling points encompassed by the pupil area;
   adding the highest energy for each of the plurality of image frames to generate a cumulative highest energy;
   comparing the cumulative highest energy to a threshold; and
   in response to the cumulative highest energy exceeding the threshold, adjusting an power output of the projector.

2. The method of claim 1, wherein the threshold is based on a maximum allowable energy output for Class 1 laser light.

3. The method of claim 2, wherein adjusting the power output of the projector comprises sending a signal to the projector to reduce the power output of the projector.

4. The method of claim 2, wherein adjusting the power output of the projector comprises sending a signal to the projector to adjust content of the plurality of image frames.

5. The method of claim 1, wherein adjusting the power output of the projector comprises sending a signal to the projector to turn off.

6. The method of claim 1, further comprising:
   in response to the cumulative highest energy not exceeding the threshold, determining whether a predetermined time has elapsed.

7. The method of claim 6, further comprising:
   in response to determining that the predetermined time has elapsed, measuring energy in a next image frame within the plurality of image frames.

8. A system comprising:
   a projector configured to emit light forming a plurality of image frames; and
   a safety system configured to:
      measure energy of at least a portion of the light emitted from the projector at a plurality of sampling points within the plurality of image frames;
      estimate a highest energy for a pupil area of each of the plurality of image frames based on a subset of the plurality of sampling points encompassed by the pupil area;
      generate a cumulative highest energy by adding an estimated highest energy for each of the plurality of image frames;
      compare the cumulative highest energy to a threshold; and
      in response to the cumulative highest energy exceeding the threshold, adjusting the light emitted from the projector.

9. The system of claim 8, wherein the threshold is based on a maximum allowable energy output for Class 1 laser light.

10. The system of claim 9, wherein adjusting the light emitted from the projector comprises sending a signal to the projector to reduce the power output from the projector.

11. The system of claim 9, wherein adjusting the light emitted from the projector comprises sending a signal to the projector to adjust content of the plurality of image frames.

12. The system of claim 8, wherein adjusting the light emitted from the projector comprises sending a signal to the projector to turn off.

13. The system of claim 8, further comprising:
in response to the cumulative highest energy not exceeding the threshold, determining whether a predetermined time has elapsed.

14. The system of claim 13, further comprising:
in response to determining that the predetermined time has elapsed, measuring energy in a next image frame within the plurality of image frames.

15. A head-mounted display (HMD) system comprising:
a projector configured to emit light forming a plurality of image frames; and
a safety system comprising:
  at least one energy monitoring component configured to measure energy of at least a portion of the light emitted from the projector at a plurality of sampling points within the plurality of image frames;
  a safety processor configured to:
    estimate a highest energy for a pupil area of each of the plurality of image frames based on a subset of the plurality of sampling points encompassed by the pupil area;
    generate a cumulative highest energy by adding an estimated highest energy for each of the plurality of image frames;
    compare the cumulative highest energy to a threshold; and
    send a signal to one of a display controller or the projector in response to the cumulative highest energy exceeding the threshold, the signal conveying instructions to adjust the light emitted from the projector.

16. The HMD of claim 15, wherein the threshold is based on a maximum allowable energy output for Class 1 laser light.

17. The HMD of claim 16, wherein the signal conveying instructions to adjust the light emitted from the projector comprises instructions to reduce the power output of the projector.

18. The HMD of claim 16, wherein the signal conveying instructions to adjust the light emitted from the projector comprises instructions to adjust content of the plurality of image frames.

19. The HMD of claim 16, wherein adjusting the light emitted from the projector comprises sending a signal to the projector to shut down.

20. The HMD of claim 16 wherein the safety processor is further configured to:
  in response to the cumulative highest energy not exceeding the threshold, determining whether a predetermined time has elapsed; and
  in response to determining that the predetermined time has elapsed, measuring energy in a next image frame within the plurality of image frames.

* * * * *